(12) United States Patent
Sterling et al.

(10) Patent No.: US 7,373,992 B2
(45) Date of Patent: May 20, 2008

(54) AUTOMATIC PRESSURE REGULATING VALVE FOR A PNEUMATIC TOOL

(75) Inventors: Matthew R Sterling, Spokane Valley, WA (US); Robert E Sterling, Colbert, WA (US)

(73) Assignee: Exhaust Technologies, Inc., Spokane, WA (US)

( * ) Notice: Subject to any disclaimer, the term of this patent is extended or adjusted under 35 U.S.C. 154(b) by 21 days.

(21) Appl. No.: 11/494,144

(22) Filed: Jul. 26, 2006

(65) Prior Publication Data

US 2008/0023208 A1    Jan. 31, 2008

(51) Int. Cl.
*B25B 9/00*    (2006.01)
(52) U.S. Cl. .................. 173/169; 173/168; 173/218; 137/115.26
(58) Field of Classification Search .......... 173/168, 173/169, 93.5, 218, 213; 137/115.26, 541; 91/169, 442, 358 A
See application file for complete search history.

(56) References Cited

U.S. PATENT DOCUMENTS

| | | | | | |
|---|---|---|---|---|---|
| 2,089,109 | A | * | 8/1937 | Brun | 173/15 |
| 2,241,184 | A | * | 5/1941 | Clark | 173/169 |
| 2,374,019 | A | * | 4/1945 | Kahler et al. | 72/453.11 |
| 2,607,559 | A | * | 8/1952 | Forss | 251/321 |
| 3,545,887 | A | * | 12/1970 | Kobnick | 417/307 |
| 3,667,345 | A | * | 6/1972 | Schaedler et al. | 91/59 |
| 3,696,834 | A | * | 10/1972 | Vonhoff, Jr. | 137/596 |
| 3,951,217 | A | * | 4/1976 | Wallace et al. | 173/169 |
| 4,109,735 | A | * | 8/1978 | Bent | 173/221 |
| 4,778,015 | A | * | 10/1988 | Jacobsson | 173/169 |
| 4,834,131 | A | * | 5/1989 | Austin | 137/115.26 |
| 5,163,354 | A | | 11/1992 | Bilodeau | |
| 5,366,026 | A | * | 11/1994 | Maruyama et al. | 173/180 |
| 5,377,769 | A | | 1/1995 | Hasuo | |
| 5,535,867 | A | | 7/1996 | Coccaro | |
| 5,901,794 | A | * | 5/1999 | Schoeps et al. | 173/93.5 |
| 5,964,302 | A | * | 10/1999 | Lin | 173/169 |
| 6,135,213 | A | * | 10/2000 | Schoeps | 173/93.5 |
| 6,164,387 | A | | 12/2000 | Chang | |
| 6,443,239 | B1 | | 9/2002 | Izumisawa | |
| 6,523,621 | B1 | * | 2/2003 | Gosis et al. | 173/206 |
| 6,644,419 | B1 | | 11/2003 | Chen | |
| 6,695,072 | B2 | * | 2/2004 | Izumisawa | 173/168 |
| 6,796,386 | B2 | * | 9/2004 | Izumisawa et al. | 173/93.5 |
| 7,025,150 | B2 | | 4/2006 | Chen | |
| 7,213,734 | B2 | * | 5/2007 | Atcheson | 227/130 |

* cited by examiner

*Primary Examiner*—Scott A. Smith
(74) *Attorney, Agent, or Firm*—Christensen O'Connor Johnson Kindness PLLC

(57) ABSTRACT

A pressure regulating air valve assembly (100) for a pneumatic tool (90) is disclosed that is movable between an open position and a closed position such that the maximum pressure in the tool is limited to a predetermined value. The valve assembly include a fitting (110) with a central aperture (112) and an upper portion (114). A valve plate (130) is disposed in the fitting, and a collar (140) having an aperture (146) is retained in the fitting. A proximal end of a tubular piston (120) extends through the aperture, and a spring (118) biases the piston toward an open position. When the pressure in the hand tool exceeds a predetermined value, the pneumatic force on a distal annular head (126) of the piston urges the piston toward the valve plate (130), closing the valve. The valve plate may include a centering portion (134) and an elastomeric panel (136).

17 Claims, 4 Drawing Sheets

AUTOMATIC PRESSURE REGULATING VALVE FOR A PNEUMATIC TOOL

BACKGROUND

The present application is in the field of pneumatic tools, such as pneumatic wrenches and the like. Conventional pneumatic tools are actuated by compressed air supplied through an air supply channel to an air-driven motor. Typically, the air pressure supplied to the air-driven motor is determined by the compressed air source. The compressed air supply varies from shop to shop, and can even vary within a shop, for example due to concurrent usage by multiple users, and/or by sustained usage by one or more users. In order to accommodate continuous and multiple users the compressed air reservoir may be maintained at a relatively high design pressure, so that the compressed air source will maintain an adequate pressure even during heavy usage.

The torque output of the air-driven motor is dependent on the pressure level of the compressed air supplied to the air motor. In conventional systems, therefore, the torque output of a pneumatic hand tool may vary, depending on the current status of the air pressure supplied to the tool. Similarly, the torque output of a pneumatic tool may vary as the tool is attached to different sources of pressurized air.

It will also be appreciated that the use of a higher pressure than needed in a pneumatic tool may produce undue mechanical stress on the workpiece, and may produce undesirably stresses on the tool and in particularly on the air motor, potentially shortening the life of the tool or increasing the maintenance costs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A pressure-regulating valve for a pneumatic hand tool is disclosed that limits the maximum sustained pressure that a pneumatic hand tool will encounter. The valve assembly includes a fitting that engages an air channel in the tool. The fitting has a tubular portion that is inserted into the air channel. A valve member is disposed in the tubular portion, and a cup-shaped collar having an aperture therethrough is also retained in the tubular portion. A piston having a tubular proximal portion and an annular head portion extends through the aperture, and is retained therein. A spring biases the piston to an open position away from the valve member. When the pressure in the tool exceeds a predetermined value the resulting force on the annular head portion of the piston overcomes the spring force, and the piston moves to engage the valve member, thereby closing the air flow path through the piston.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
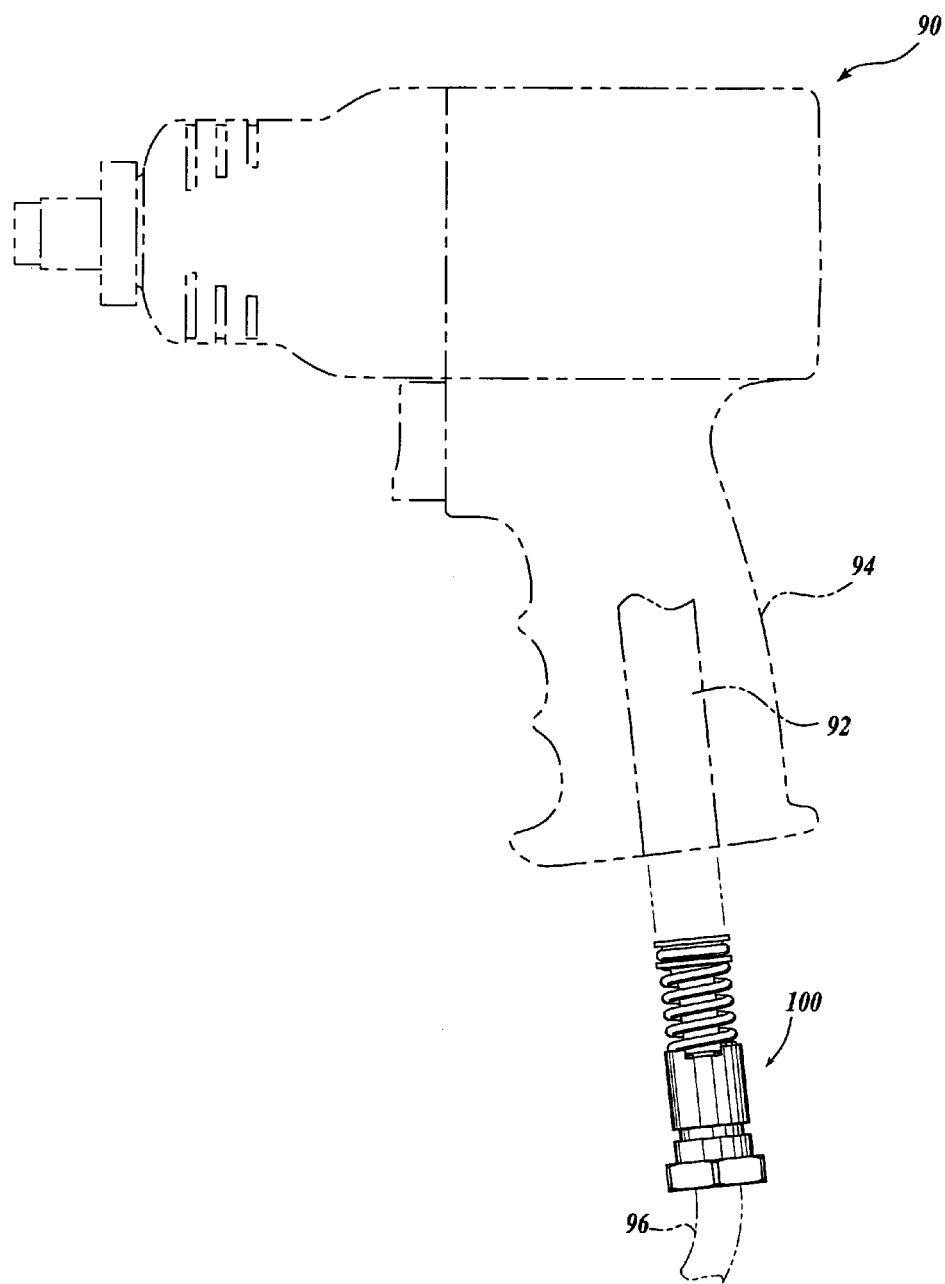
FIG. 1 shows a pneumatic tool (in phantom) with a pressure-regulating air valve assembly in accordance with the teachings of the present invention, and positioned for insertion into the tool.

Refer now to FIG. 1 which shows a pneumatic hand tool 90 in phantom. Although an impact wrench is shown, it will be appreciated that the tool 90 may alternatively be any pneumatic tool, for example a pneumatic torque wrench, sprayer, grinder, or the like. A pressure-regulating air valve assembly 100 is shown, positioned to be inserted into the handle 94 of the tool 90. The air valve assembly 100 is designed to be inserted into the air inlet channel 92 in the handle 94 of the tool 90, and may attach thereto by any method, as are well-known in the art. For example, the air valve assembly 100 may be retained in the tool 90 using a conventional quick release mechanism (not shown). As discussed in more detail below, the air valve assembly 100 provides an air pressure regulating function that generally prevents the air pressure to the tool motor (not shown) from exceeding a certain preset value. For example, in a particular embodiment of the invention, the air supply to the tool motor is closed whenever the air pressure exceeds 90 psi.

Figure 2:
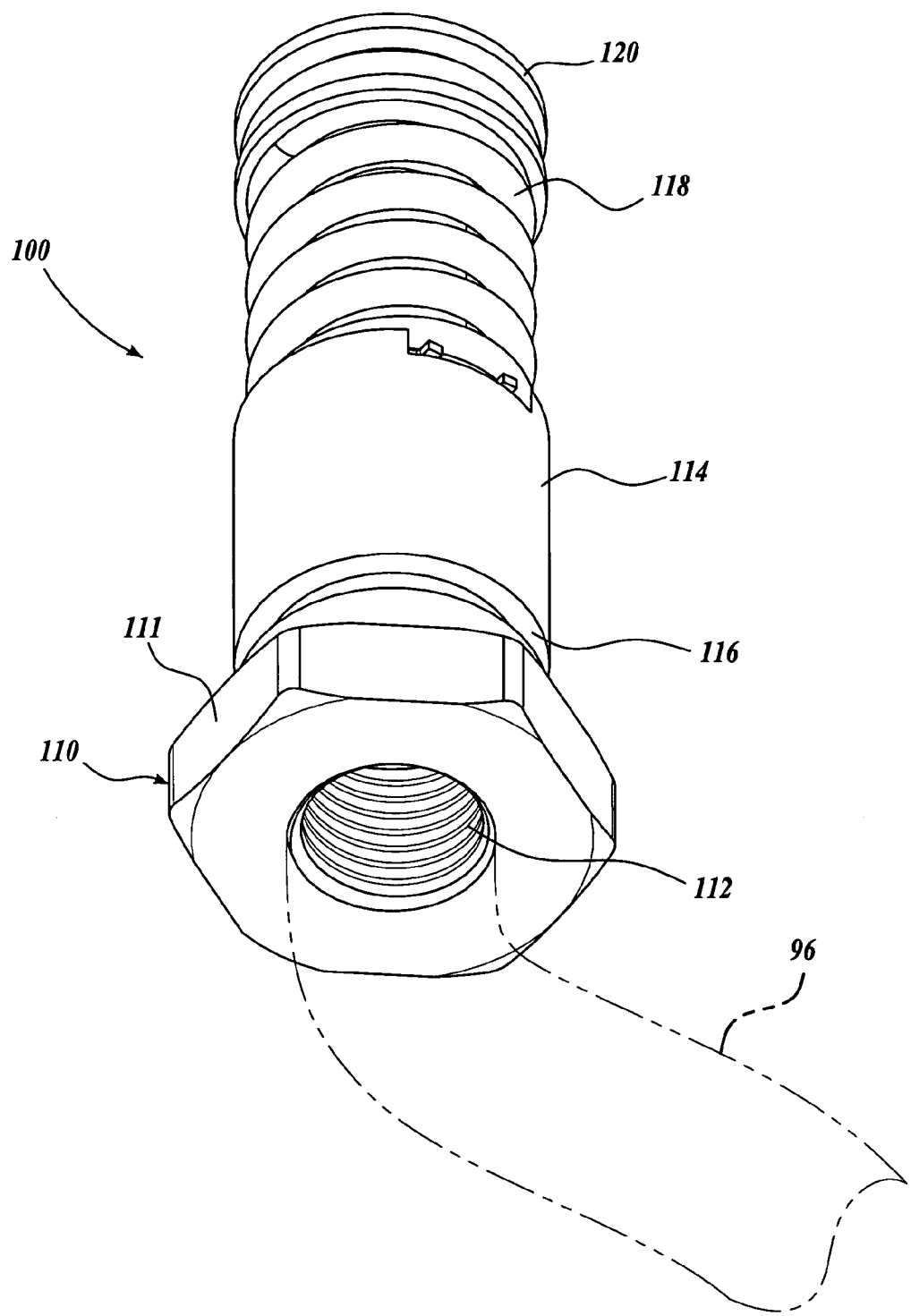
FIG. 2 is a perspective view of the pressure-regulating air valve assembly shown in FIG. 1.

A perspective view of the pressure-regulating air valve assembly 100 is shown in isolation in FIG. 2. The air valve assembly 100 includes an air inlet fitting 110 defining a central aperture 112 that may include a threaded portion to engage a pressurized air supply line 96 (shown in phantom) from a conventional air supply (not shown). The proximal end 111 of the air inlet fitting 110 may conveniently be hexagonally shaped in a conventional size to facilitate attachment of the air supply line 96. The air inlet fitting 110 includes a circumferential groove 116 that is adapted to facilitate engagement with a conventional quick-release coupling or other locking member (not shown) on the tool handle 94.

An upper portion 114 of the air inlet fitting 110 extends from the proximal end 111, and is generally tubular, such that the upper portion 114 continues the fluid flow path from the central aperture 112. Although the disclosed air inlet fitting 110 is of unitary construction, it will be appreciated that the fitting may alternatively be formed as an assembly.

As discussed in detail below, the air valve assembly 100 further includes a generally tubular piston 120 that is movable between an open position and a closed position (see, FIG. 4). The piston 120 is biased toward the open position by a spring 118.

Figure 3:
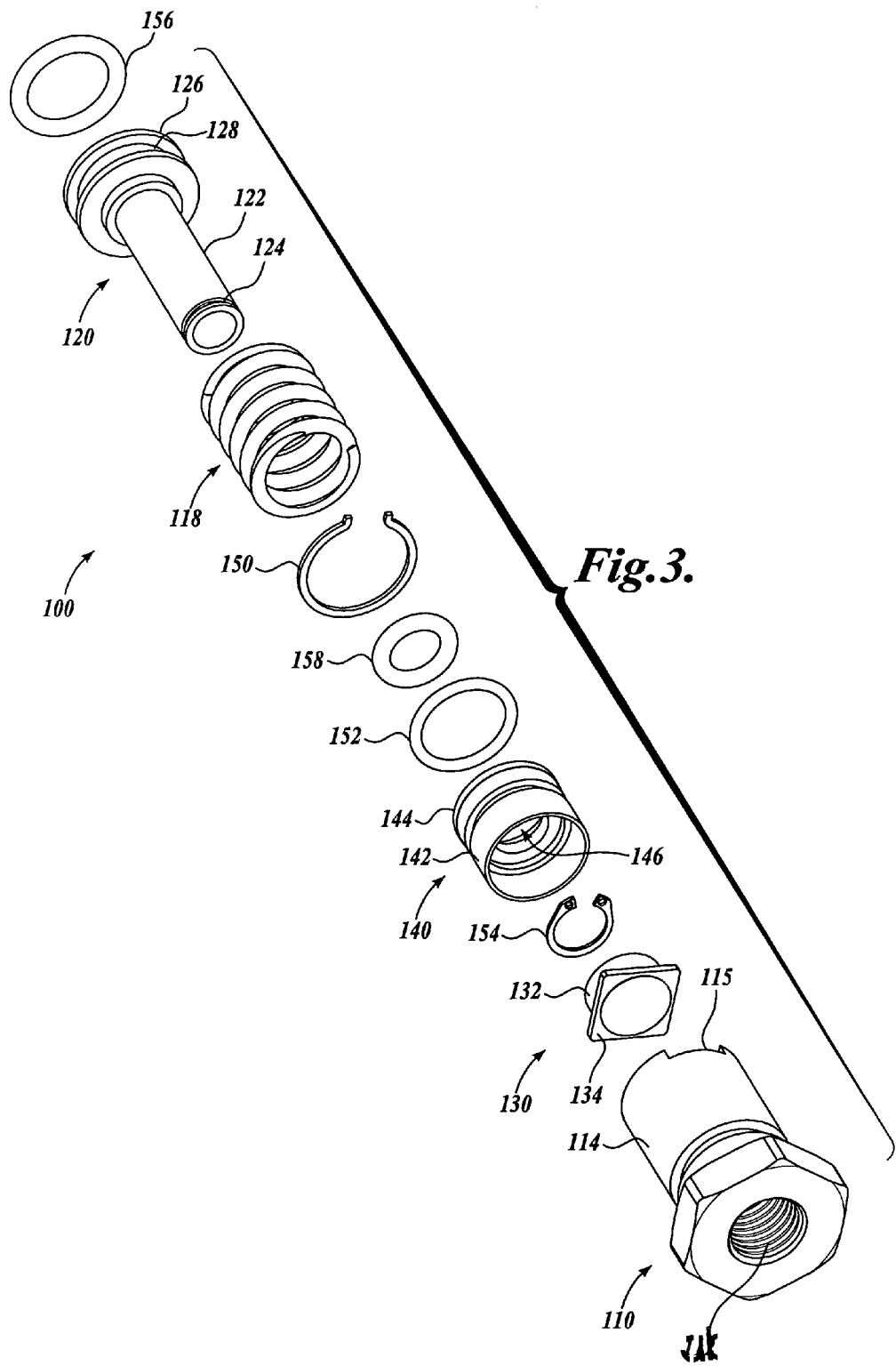
FIG. 3 is an exploded view of the pressure-regulating air valve assembly shown in FIG. 1.
Figure 4:
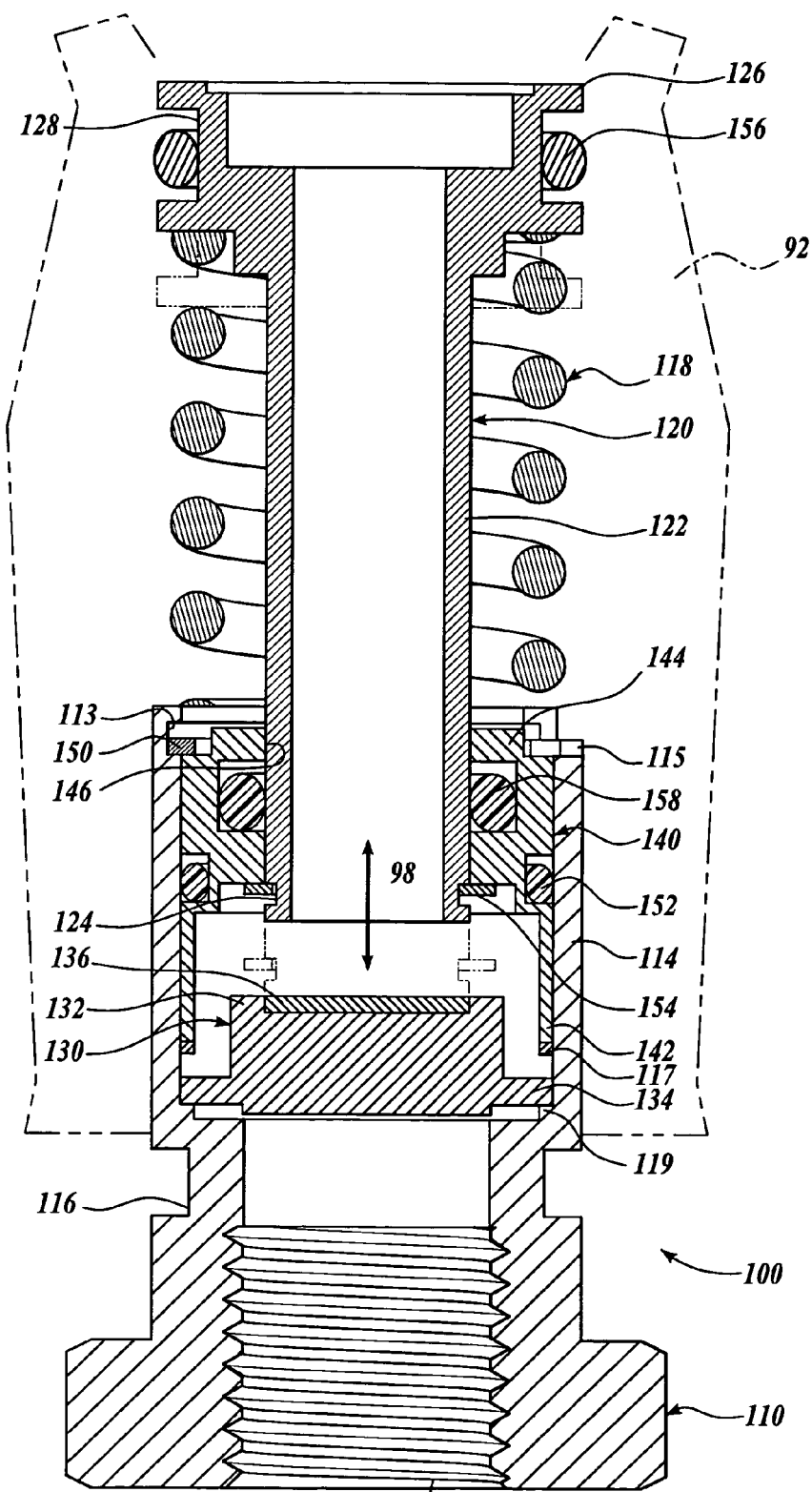
FIG. 4 is a cross-sectional side view of the pressure-regulating air valve assembly shown in FIG. 1.

Refer now to FIG. 3, which shows an exploded view of the pressure-regulating air valve assembly 100, and also to FIG. 4, which shows a cross-sectional view of the air valve assembly 100, with the inner wall for the tool air inlet channel 92 shown in phantom. As seen most clearly in FIG. 3, the air valve assembly 100 includes the air inlet fitting 110, a valve plate 130 that is retained within the fitting 110, an annular collar 140 that is also inserted into the fitting 110, the spring 118, and the piston 120.

The valve plate 130 includes a circular valve portion 132, and a positioning plate 134. The valve plate 130 is sized to be slidably disposed in the upper portion 114 of the air inlet fitting 110, the diagonal dimension of the positioning plate 134 being slightly smaller than the inner diameter of the upper portion 114 of the air inlet fitting 110, such that the round valve portion 132 is maintained in a substantially centered position within the fitting 110. In an exemplary embodiment the valve portion 132 includes an elastomeric panel 136 attached to the upwardly-disposed face, as seen most clearly in FIG. 4. A lip or shoulder 119 is provided near the interior base of the upper portion 114, positioned to hold the valve plate 130 away from the central aperture 112.

The annular collar 140 is generally cup-shaped, and includes a cylindrical outer wall 142 and an annular rear portion 144 defining a piston aperture 146. The collar 140 is sized to be inserted into the upper portion 114 of the fitting 110. The valve plate 130 is therefore retained between the shoulder 119 and the collar 140. The inner diameter of the upper portion 114 of the fitting 110 may include one or more protrusions 117 that limits how far the collar 140 can be inserted into the fitting 110. A locking C-clip retainer 150 engages an inside-diameter channel 113, above the collar 140, thereby retaining the collar 140 in the fitting 110. A notch 115 in the end of the upper portion 114 facilitates engagement of the retainer 150. An outer O-ring 152 provides a seal between the fitting 110 and the collar 140.

The piston 120 includes a tubular portion 122 that extends through the spring 118 and into the piston aperture 146 in the collar 140. A circumferential groove 124 near the end of the tubular portion 122 engages a second locking C-clip retainer 154, to retain the piston 120 with the collar 140. An annular head portion 126 of the piston 120 is sized to engage the distal end of the spring 118, and the spring 118 is sized such that the piston 120 is biased generally away from the collar 140. The annular head portion 126 of the piston 120 includes a circumferential groove 128 that receives a second O-ring 156, providing a seal between the piston 120 and the air inlet channel 92. Another O-ring 158 disposed near the rear portion 144 of the collar 140 provides a seal between the collar 140 and the tubular portion 122 of the piston 120.

The operation of the air valve assembly 100 can now be appreciated, with particular reference to FIGS. 1 and 4. The air valve assembly 100 is inserted into the tool 90 to provide pressurized air through air line 96. The piston 120 is initially biased towards the open position shown in FIG. 4, whereby air enters the tool 90 through the central aperture 112 in the fitting 110, around the valve plate 130, through the piston 120, supplying pressurized air to a conventional air motor (not shown). It will be appreciated by the artisan that the air pressure in the tool 90 will exert a force on the annular head portion 126 of the piston 120, that is in the opposite direction to the biasing force exerted by the spring 118. When the pressure in the tool 90 reaches a design pressure (determined in part by the spring force constant), the pneumatic force will overcome the spring force, moving the piston 120 toward the valve plate 130 (indicated in phantom). When the piston 120 abuts the valve plate 130, the air flow path to the air motor is closed. It will be apparent that as the air pressure drops (due to air flow through the air motor) the spring 118 will again tend to move the piston 120 toward the open position. The open and close motion of the piston 120 is indicated in FIG. 4 by arrow 98. The competing elastic and pneumatic forces will therefore maintain the pressure in the tool 90 at a desired design pressure while the tool 90 is in use.

It will be appreciated that while the currently preferred embodiment of the air valve assembly 100 has been described, the disclosed embodiment may be modified in obvious ways without departing from the present invention. For example, the valve plate 130 may be of unitary construction, or may be a sub-assembly, and may utilize other positioning mechanisms to maintain the desired alignment with the piston 120. Similarly, it is contemplated that the collar 140 may be formed integrally with the fitting 110, with straightforward modifications to the rest of the assembly. Alternative mechanisms for biasing the piston to the open position are also possible, including for example an elastomeric collar or the like, or a biasing member disposed inside the fitting. These, and other adaptations of the disclosed air valve assembly can be made without departing from the spirit and scope of the invention.

The embodiments of the invention in which an exclusive property or privilege is claimed are defined as follows:

1. A pressure regulating valve assembly for a pneumatic hand tool having an air inlet channel, the pressure regulating valve assembly comprising:
   an inlet fitting having an inlet aperture adapted to receive an air line providing a source of pressurized air, the inlet fitting including a tubular portion having an inside diameter;
   a valve member slideably disposed in the inlet fitting, the valve member including a square centering portion having a diagonal dimension slightly smaller that the inside diameter of the inlet fitting tubular portion;
   a collar retained in the inlet fitting, the collar having a piston aperture;
   a piston having a tubular proximal end that slidably engages the piston aperture in the collar, and an annular head portion, the piston defining an axial channel therethrough, the piston being movable between an open position and a closed position;
   a biasing member that biases the piston toward the open position;
   wherein, when the piston is in the open position a fluid flow path through the inlet aperture and through the axial channel in the piston is open, and when the piston is in the closed position the piston abuts the valve member such that the fluid flow path is closed.

2. The pressure regulating valve assembly of claim 1, wherein during use air pressure from the source of pressurized air produces a force on the piston in the opposite direction from the bias from the biasing member.

3. The valve assembly of claim 1, wherein the collar is lockingly retained in the inlet fitting.

4. The valve assembly of claim 3, wherein the collar is retained by a C-shaped retaining ring.

5. The valve assembly of claim 1, wherein the proximal end of the piston is lockingly retained in the collar with a retaining ring.

6. The valve assembly of claim 1, wherein the valve member includes an elastomeric panel positioned to engage the piston when the piston is in the closed position.

7. The valve assembly of claim 1, wherein the collar comprises a circumferential outer groove adapted to receive an o-ring for sealingly engaging the upper portion of the inlet fitting, and a circumferential inner groove adapted to receive an o-ring for sealingly engaging the proximal end of the piston.

8. The valve assembly of claim 1, wherein the inlet fitting is adapted to engage a quick-release mechanism.

9. The valve assembly of claim 1, wherein the annular head portion of the piston includes an o-ring adapted to sealingly engage the air inlet channel in the hand tool.

10. A valve assembly for a pneumatic tool, the valve assembly comprising:

an inlet fitting having an inlet aperture adapted to engage a source of pressurized air, and a tubular upper portion;

a valve plate slideably disposed in the tubular upper portion of the inlet fitting, the valve plate including a square centering portion having a diagonal dimension slightly smaller than an inside diameter of the upper portion of the inlet fitting;

a collar retained in the inlet fitting, the collar having a center aperture;

a piston having a tubular proximal portion and a distal annular head portion, wherein the proximal portion extends through the collar center aperture, the piston defining an axial channel therethrough;

a biasing member that exerts a biasing force on the piston away from the valve plate;

wherein, when the air pressure in the pneumatic tool exceeds a predetermined value the pneumatic force on the annular head portion of the piston overcomes the biasing force on the piston such that the piston moves to engage the valve plate.

11. The valve assembly of claim 10, wherein the collar is lockingly retained in the upper portion of the inlet fitting.

12. The valve assembly of claim 10, wherein the proximal end of the piston is lockingly retained in the collar with a retaining ring.

13. The valve assembly of claim 10, wherein the valve member includes an elastomeric panel positioned to engage the piston when the piston is in the closed position.

14. A pneumatic hand tool comprising:
a handle having an air inlet channel therethrough;
a valve assembly releasably disposed in the air inlet channel, the valve assembly including:
an inlet fitting having an inlet aperture adapted to engage a source of pressurized air, and a tubular upper portion;

a valve plate slideably disposed in the tubular upper portion of the inlet fitting, the valve plate including a square centering portion having a diagonal dimension slightly smaller than an inside diameter of the upper portion of the inlet fitting;

a collar retained in the inlet fitting, the collar having a center aperture;

a piston having a tubular proximal portion and a distal annular head portion, wherein the proximal portion extends through the collar center aperture, the piston defining an axial channel therethrough;

a biasing member that exerts a biasing force on the piston away from the valve plate;

wherein, when the air pressure in the pneumatic tool exceeds a predetermined value the pneumatic force on the annular head portion of the piston overcomes the biasing force on the piston such that the piston moves to engage the valve plate.

15. The valve assembly of claim 14, wherein the collar is lockingly retained in the upper portion of the inlet fitting.

16. The valve assembly of claim 14, wherein the proximal end of the piston is lockingly retained in the collar with a retaining ring.

17. The valve assembly of claim 14, wherein the valve member includes an elastomeric panel positioned to engage the piston when the piston is in the closed position.

* * * * *

UNITED STATES PATENT AND TRADEMARK OFFICE
CERTIFICATE OF CORRECTION

PATENT NO. : 7,373,992 B2  Page 1 of 1
APPLICATION NO. : 11/494144
DATED : May 20, 2008
INVENTOR(S) : M. R. Sterling et al.

It is certified that error appears in the above-identified patent and that said Letters Patent is hereby corrected as shown below:

| COLUMN | LINE | ERROR |
|---|---|---|
| Item (75) Pg. 1, col. 1 | Inventors | "Matthew R Sterling" should read --Matthew R. Sterling-- |
| Item (75) Pg. 1, col. 1 | Inventors | "Robert E Sterling" should read --Robert E. Sterling-- |
| 4 (Claim 1, | 24 line 10) | "slightly smaller that" should read --slightly smaller than-- |

Signed and Sealed this

Nineteenth Day of January, 2010

David J. Kappos
*Director of the United States Patent and Trademark Office*